United States Patent Office 3,413,314
Patented Nov. 26, 1968

3,413,314
PROCESS FOR THE SYNTHESIS OF 4,5-SECO-Δ⁹-STEROIDS AND INTERMEDIATES
Gaston Amiard and Gerard Nomine, Noisy-le-Sec, France, assignors to Roussel-Uclaf, S.A., Paris, France, a corporation of France
No Drawing. Continuation-in-part of application Ser. No. 262,263, Mar. 1, 1963. This application Apr. 22, 1964, Ser. No. 361,872
Claims priority, application France, Mar. 6, 1962, 890,184; Dec. 17, 1963, 957,460
60 Claims. (Cl. 260—343.2)

This application is a continuation-in-part of the commonly assigned, copending United States patent application Ser. No. 262,263, filed Mar. 1, 1963, and now abandoned.

The present invention relates to a new process for the total synthesis of steroids and intermediates produced therein. The novel synthesis is based on the principle of construction of the tetracyclic skeleton of the steroids starting from the D ring in the following sequence:

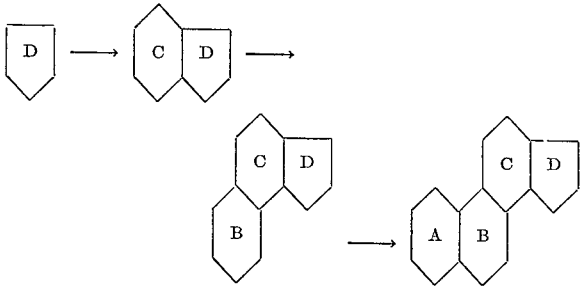

Whereas previous authors have described processes for total synthesis of steroids passing in general by the intermediary of a six membered D ring, which they were thereafter obliged to contract into a five membered ring, the process according to the invention directly obtains the skeleton of the cyclopentanophenanthrene molecule.

An object of the present invention is the development of a process for the total synthesis of steroids.

Another object of the present invention is the development of a process for the production of a 13β-lower alkyl-4,5-seco-Δ⁹-gonene starting from 2-lower alkyl-cyclopentane-1,3-dione and a lower alkyl ester of 5-oxo-6-heptenoic acid.

A still further object of the invention is the development of a process for the production of a 13β-lower alkyl-4,5-seco-Δ⁹-gonene steroid of the formula

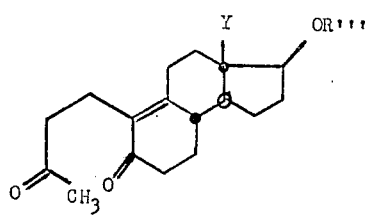

wherein Y represents a lower alkyl and R''' is selected from the group consisting of hydrogen and the acyl radical of an organic carboxylic acid having from 1 to 18 carbon atoms which comprises the steps of:

(a) Condensing a lower alkyl ester of 5-oxo-6-heptenoic acid with 2-lower alkyl-cyclopentane-1,3-dione in the presence of an alkaline condensation agent,
(b) Treating the condensation product with an acidic compound selected from the group consisting of mineral acids, organic acids and Lewis-type acids,
(c) Treating the racemic 1,5-dioxo-4-(2'-carboxyethyl)-7a-lower alkyl 5,6,7,7a-tetrahydro-indane with an optically active base,
(d) Separating the salt of the optically active base with the dextrorotatory 1,5-dioxo-4-(2'-carboxyethyl)-7aβ-lower alkyl 5,6,7,7a-tetrahydro-indane,
(e) Acidifying and recovering said dextrorotatory 1,5-dioxo-4-(2'-carboxyethyl)-7aβ-lower alkyl-5,6,7,7a-tetrahydro-indane,
(f) Reacting the dextrorotatory 1,5-dioxo-4-(2'-carboxyethyl) - 7aβ - lower alkyl - 5,6,7,7a - tetrahydro - indane with a mixed metal hydride,
(g) Hydrogenating the indane compound of the formula

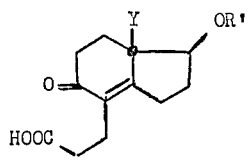

wherein Y has the above-noted meaning and R' is selected from the group consisting of hydrogen and the acyl radical of an organic carboxylic acid having from 1 to 7 carbon atoms in the presence of a hydrogenation catalyst,
(h) Lactonizing the 1β-hydroxy-5-oxo-4-(2'-carboxyethyl) - 7aβ - lower alkyl - 3aα,4β,5,6,7,7a - hexahydro-indane by the action of a lactonizing agent selected from the group consisting of a lower alkanoic acid chloride and a lower alkanoic acid anhydride,
(i) Reacting the δ-lactone having the formula

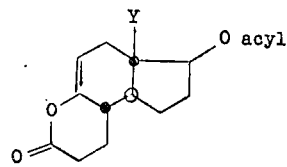

wherein Y has the above-noted meaning and acyl represents the acyl radical of a lower alkanoic acid derived from said lactonizing agent, with a 4-ketal of 4-oxopentyl-magnesium halide,
(j) Treating the reaction product with an alkaline agent,
(k) Hydrolyzing the reaction product by the action of an aqueous acidic solution, and
(l) Recovering said 13β-lower alkyl-4,5-seco-Δ⁹-gonene steroid.

A further object of the invention is the production of the following intermediate products:
(a) Racemic 1,5- - dioxo-4(2'-carboxyethyl)-7a-lower alkyl-5,6,7,7a-tetrahydro-indane and its lower alkyl esters,
(b) The dextrorotatory isomer of 1,5-dioxo-4-(2'- carboxyethyl)-7a-lower alkyl-5,6,7,7a-tetrahydro-indane,
(c) The salt of the dextrorotatory isomer of 1,5-dioxo-4-(2' - carboxyethyl)-7a-lower alkyl - 5,6,7,7a-tetrahydro-indane and 1-ephedrine,
(d) The indane compound of the formula

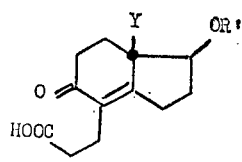

wherein Y represents a lower alkyl and R' is selected from the group consisting of hydrogen and the acyl radical of an organic carboxylic acid having from 1 to 7 carbon atoms, and particularly the compound where R' represents formyl and Y represents methyl, ethyl, n-propyl or isopropyl, (e) The indane compound of the formula

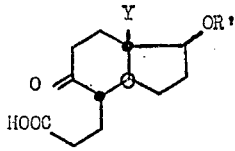

wherein Y represents lower alkyl and R' is selected from the group consisting of hydrogen and the acyl radical of an organic carboxylic acid having from 1 to 7 carbon atoms, and particularly the compounds where R' represents hydrogen and acetyl and Y represents methyl, ethyl, n-propyl or isopropyl, (f) The δ-lactone having the formula

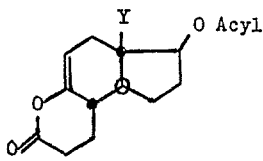

wherein Y represents lower alkyl and acyl represents the acyl radical of a lower alkanoic acid, and particularly the lactone of the acetate (acyl=COCH$_3$), where Y represents methyl, ethyl, n-propyl or isopropyl, (g) 4,5-seco-Δ$^9$-estrene-17β-ol-3,5-dione, (h) 13β-ethyl-4,5-seco-Δ$^9$-gonene-17β-ol-3,5-dione, (i) 13β-ethyl-Δ$^{4,9}$-gonadiene-17Δ-ol-3-one, (j) 13β-ethyl-Δ$^{1,3,5(10)}$-gonatriene - 3,17β - diol(18-nor-13β-ethyl-estradiol).

These and other objects of the invention will become more apparent as the description thereof proceeds.

We have discovered a new process for the total synthesis of steroids starting from 2-lower alkyl-cyclopentane-1,3-dione and a lower alkyl ester of 5-oxo-6-heptenoic acid to obtain a 4,5-seco-Δ$^9$-gonene steroid which can be transformed according to known processes into (1) Δ$^{4,9}$ - estradiene - 17β-ol-3-one, or 17β-acyloxy-Δ$^{4,9}$-estradiene-3-one or 17β-acyloxy-Δ$^4$-estrene-3-one wherein the acyl radical represents the remainder of an organic carboxylic acid having from 1 to 18 carbon atoms, when the lower alkyl of 2-lower alkyl-cyclopentane-1,3-dione is methyl; (2) 13β-n-propyl-Δ$^{4,9}$-gonadiene-17β-ol-3-one, when the lower alkyl of 2-lower alkyl-cyclopentane-1,3-dione is n-propyl; and (3) 13β-ethyl-Δ$^{4,9}$-gonadiene-17β-ol-3-one or 13β - ethyl-Δ$^{1,3,5(10)}$-gonatriene - 3,17β - diol, when the lower alkyl of 2-lower alkyl-cyclopentane-1,3-dione is ethyl.

These compounds are useful steroidal products due to their intense anabolic activity and are also important intermediates for the elaboration of other steroids.

The new process of the invention is distinguished, above all, by the simplicity of its reactions which can be easily executed at very moderate temperatures, and by the utilization of common solvents which do not require care in using the same. In this process, there is no requirement for reactions which are dangerous to the worker, as is the case, for example, with the reductions according to the Birch method, nor for reactions reported to be laborious or not furnishing good yields as is the case of the Stobbe condensation.

Due to the discovery of a process of stereo-specific reduction of the double bond in the 3a,4-position of the substituted indane which furnishes the desired trans isomer according to the partial flow diagram

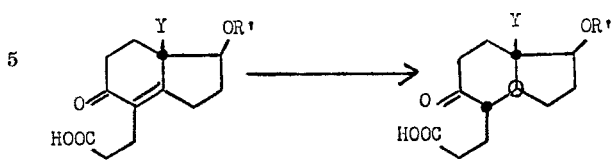

where Y represents lower alkyl and R' is selected from the group consisting of hydrogen and the acyl radical of an organic carboxylic acid having from 1 to 7 carbon atoms, which constitutes one of the fundamental characteristics of the present invension, it is possible to obtain, in the first steps of the synthesis, the pentagonal configuration of ring D. The trans derivative thus obtained is the first reported representative of this series of bi-cyclic steroid precursors having a preformed D ring. Previously, only the six membered analogs of the D ring (see U.S. Patent No. 2,839,537) were known.

This stereospecific reduction contradicts generally held theories according to which a reduction in compounds of the indane series, and contrary to that which occurs for compounds of the decaline series, would furnish a cis-hydrindane, considered as the most stable isomer (see, for example, the work of Chanduri et al., J. Ind. Chem. Soc. 1956, 33, p. 81 and Boyce et al., Soc. 1960, p. 4547).

In the process according to the invention the loss of yield which occurs in prior art processes during the transformation of the hexagonal D ring to the pentagonal D ring which is particularly disadvantageous since it occurs normally at the end of the synthesis, that is to say, at the moment when the product possesses a very considerable value, is avoided.

Another advantage of the present invention consists in taking advantage of the slight difference of reactivity between the ketone in the 1-position and the ketone in the 5-position of the bicyclic intermediates having the indanic structure in order to reduce in the early steps of the synthesis the ketone in the 1-position into the corresponding alcohol with very elevated yields. This permits consequently an easy blockage of the 1-position, for example, with an ester.

A further advantage of the process of the invention resides in the ease with which the indanic compound having a ketone in the 5-position and an ester or alcohol group in the 1-position undergoes lactonization. Finally, this lactone readily undergoes a Grignard reaction with a 4-oxopentyl magnesium halide whose ketone function has been previously protected in the form of a ketal to give the desired 13β-lower alkyl-4,5-seco-Δ$^9$-gonene structure.

Still other advantages will appear to the specialist in the art in the description which follows:

A description of the process of the invention can be better understood with reference to the reaction diagram of Table I.

TABLE I

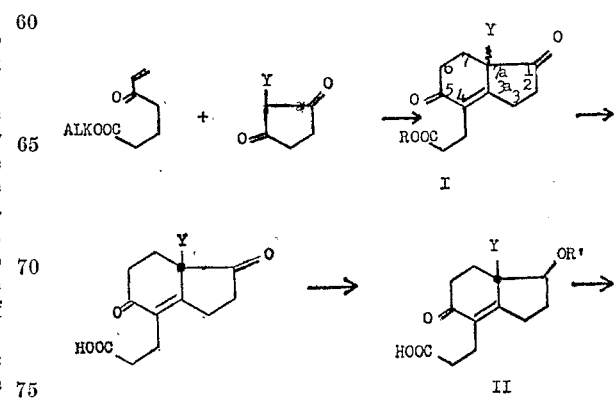

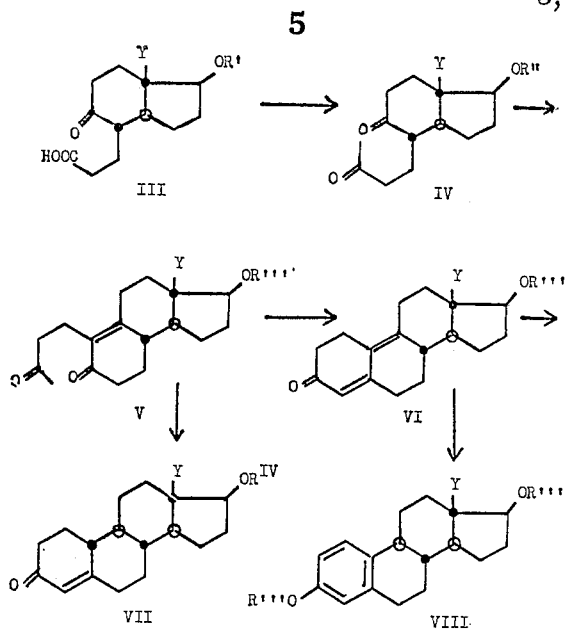

The ξ bond in Formula I indicates the presence of a mixture of 7aα and 7aβ epimers.

Alk represents lower alkyl.

Y represents lower alkyl.

R represents hydrogen or lower alkyl.

R' represents hydrogen or the acyl radical of an organic carboxylic acid having from 1 to 7 carbon atoms.

R'' represents the acyl radical of an organic carboxylic acid having from 1 to 7 carbon atoms.

R''' represents hydrogen or the acyl radical of an organic carboxylic acid having from 1 to 18 carbon atoms.

$R^{IV}$ represents the acyl radical of an organic carboxylic acid having from 1 to 18 carbon atoms.

The process of the invention is characterized primarily in that a lower alkyl ester of 5-oxo 6-heptenoic acid is condensed with 2-lower alkyl-cyclopentane-1,3-dione in the presence of an alkaline condensation agent. The condensation product is treated with an acid in the presence of water to obtain 1,5-dioxo-4-(2'-carboxy ethyl)-7a-lower alkyl-5,6,7,7a-tetrahydro-indane (I, with R=H) directly or by an acid or an acidic reacting compound in an anhydrous media such as a mixed acid base to recover the lower alkyl ester of the above indanic compound (I, with R=lower alkyl). This ester is then hydrolyzed. Compound I, where R=H, is resolved with the aid of an optically active base into its optical antipodes. The salt of the dextrorotatory epimer is separated and the dextrorotatory epimer is recovered. The synthesis is continued on the dextrorotatory epimer IA. The ketone in the 1-position of Compound IA is reduced with the aid of a mixed metal hydride. The reduced product, 1β - hydroxy - 5 - oxo - 4-(2' - carboxyethyl) - 7aβ - lower alkyl-5-5,6,7a-tetrahydro-indane (II, with R'=H) or an ester of the latter with an organic carboxylic acid having from 1 to 7 carbon atoms (II, with R'=acyl) is subjected to catalytic hydrogenation. In the case of the presence of an ester function in the 1-position, the product is subjected to a treatment with aqueous alcoholic alkalis and, in either event, 1β-hydroxy-5-oxo-4-(2'-carboxyethyl)-7aβ-lower alkyl-3aα, 4β,5,6,7,7a-hexahydro-indane (III, with R'=H) is obtained. Compound III, R'=H is transformed with the aid of the acid chloride or acid anhydride of an organic carboxylic acid having from 1 to 7 carbon atoms into the δ-lactone of 1β-OR''-4-(2'-carboxyethyl) - 5 - hydroxy-7aβ-lower alkyl-3aα,4β,7,7a-tetrahydro-indane (IV, with R''=the acyl radical of the organic carboxylic acid having from 1 to 7 carbon atoms used in the form of its chloride or anhydride). Compound IV is caused to react with a 4-oxo-pentyl magnesium halide, whose ketone function was previously protected in the form of a ketal, in a Grignard reaction. The reaction product is treated with an alkaline agent, then the product formed is subjected to an acid hydrolysis and 13β-lower alkyl-4,5-seco-Δ⁹-gonene-17β-ol-3,5-dione (V, with R'''=H) is obtained.

Compound V, where Y=CH₃ and R'''=H is transformed according to known procedures into Δ⁴,⁹-estradiene-17β-ol-3-one (VI, with Y=CH₃ and R'''=H) or an ester of the latter (VI, with Y=CH₃ and R''' representing the acyl radical of an organic carboxylic acid having from 1 to 18 carbon atoms). This latter esterified product can be isomerized into an ester of estradiol (VIII, with Y=CH₃ and R''' representing the acyl radical of an organic carboxylic acid having from 1 to 18 carbon atoms). Alternatively, Compound V, where Y=CH₃ and R'''=H, is converted into 17β-acyloxy-Δ⁴-estrene-3-one (VII, Y=CH₃ and $R^{IV}$ representing acyl radical of an organic carboxylic acid having from 1 to 18 carbon atoms).

Similar end products can be obtained when Y represents ethyl or n-propyl, for example:

13β - ethyl - Δ⁴,⁹ - gonadiene - 17β - ol - 3 - one (VI, with Y=C₂H₅ and R'''=H)

13β - n - proply - Δ⁴,⁹ - gonadiene - 17β - ol - 3 - one (VI, with Y=CH₂—CH₂—CH₃ and R'''=H)

13β - ethyl - Δ¹,³,⁵⁽¹⁰⁾ - gonatriene - 3,17β - diol or 18-nor - 13β - ethyl - estradiol (VIII, with Y=C₂H₅ and R'''=H)

13β - n - propyl - Δ¹,³,⁵⁽¹⁰⁾ - gonatriene - 3, 17β - diol or 18 - nor - 13β - n - propyl - estradiol (VIII, with Y=CH₂—CH₂—CH₃ and R'''=H)

The acyl radicals of organic carboxylic acids having from 1 to 18 carbon atoms are those of aliphatic or cycloaliphatic, saturated or unsaturated carboxylic acids or those of aromatic or heterocyclic carboxylic acids: For example, alkanoic acids, such as formic acid, acetic acid, propionic acid, butyric acid, isobutyric acid, valeric acid, isovaleric acid, trimethylacetic acid, capronic acid, β- trimethylpropionic acid, oenanthic acid, caprylic acid, pelargonic acid, capric acid, undecyclic acid, lauric acid, myristic acid, palmitic acid, stearic acid; alkenoic acids such as undecylenic acid, oleic acid; cycloalkanoic acids, such as cyclopentyl, cyclopropyl, cyclobutyl and cyclohexyl carboxylic acids; cycloalkylalkanoic acids, such as cyclopropylmethylcarboxylic acid, cyclobutylmethylcarboxylic acid, cyclopentylethylcarboxylic acid, cyclohexylethylcarboxylic acid; phenylacetic or propionic acid; benzoic acid; phenoxyalkanoic acids such as, penoxyacetic acid, p-chlorophenoxyacetic acid, 2,4-dichlorophenoxyacetic acid, 4-ter-butylphenoxyacetic acid, 3-phenoxypropionic acid, 4-phenoxybutyric acid; heterocyclic acids, such as furane-2-carboxylic acid, 5-ter-butylfurane - 2 - carboxylic acid, 5 - bromo - furane - 2-carboxylic acid, nicotinic acid; β-ketocarboxylic acids, such as acetylacetic acid, propionylacetic acid, butyrylacetic acid, aminoacids, such as diethylaminoacetic acid, aspartic acid; etc.

Preferably, the process of the invention is executed according to the following steps. However, other equivalent operatory modes may be employed.

As lower alkyl ester of 5-oxo-6-heptenoic acid, the methyl or ethyl ester is preferred.

The condensation of a lower alkyl ester of 5-oxo-6-heptenoic acid with 2-lower alkyl-cyclopentane-1,3-dione is advantageously effected in the presence of a tertiary organic base, such as pyridine, α, β or γ-picoline, triethylamine, etc., or else on the presence of a salt of above cited bases as, for example, pyridinium phosphate. It is advantageous to conduct the reaction under anhydrous conditions at temperatures up to the reflux temperature. Small amounts of hydroquinone may also be utilized in the reaction media.

The condensation of a lower alkyl ester of 5-oxo-6-heptenoic acid with 2-lower alkyl-cyclopentane-1,3-dione leads to the corresponding ester of 7-(1',3'-dioxo-2'-lower alkyl-cyclopentyl-2')-5-oxo-heptenoic acid which is unnecessary to isolate. If this compound is treated in an anhydrous media with an organic acid such as p-toluene sulfonic acid or a mineral acid such as hydrochloric acid or by an acidic reacting compound in an anhydrous media such as a mixed acid base as defined by Lewis, for example, by a quaternary ammonium salt such as the acetate or benzoate of trimethylamine or triethylamine, Compound I is obtained in the form of its ester. The reaction occurs at temperatures up to the reflux temperature and thereafter the ester is treated with an aqueous acid such as hydrochloric acid to obtain Compound I in its free acid form. If, by contrast, as is most simple, the condensation product is treated with an acid in an aqueous media, the free acid is directly obtained.

The resolution of 1,5 - dioxo - 4 - (2' - carboxyethyl) - 7a - lower alkyl - 5,6,7,7a - tetrahydro - indane (I, with R=H), is advantageously realized with the aid of 1-ephedrine, but other optically active bases, such as quinine, cinchonine, threo(+) 1 - p - nitrophenyl-2 - amino - propanediol - 1,3 can also be used. The 1-ephedrine salt with dextrorotatory 1,5-dioxo-4-(2'-carboxyethyl) - 7aβ - lower alkyl - 5,6,7,7a - tetrahydroindane readily crystallizes and the free acid is recovered by treating a solution of the salt in an inert organic solvent with an acid such as oxalic acid and removing the 1-ephedrine oxalate.

In order to reduce the ketone in the 1-position of 1,5-dioxo - 4 - (2' - carboxyethyl) - 7aβ - lower alkyl - 5,6, 7,7a-tetrahydro-indane, IA, an alkali metal borohydride is preferably used, for example, sodium or potassium borohydride. The reaction occurs at low temperatures, from amout −5° C. to 20° C., preferably at a pH of below 7.

The reduced compound can next be transformed into an ester with an organic carboxylic acid having from 1 to 7 carbon atoms, such as the formate, acetate or benzoate and the synthesis carried out on the product, Compound II, R'=acyl, whose hydroxyl is protected by this blockage. However, it is also possible to continue this synthesis on the free alcohol, Compound II, R'=H, which one can, it is to be understood, esterify eventually a later step.

The stereoselective hydrogenation of 1β - OR' - 5-oxo - 4 - (2' - carboxyethyl - 7aβ - lower alkyl - 5,6, 7,7a-tetrahydro-indane, II (R'=H or an acyl radical of an organic carboxylic acid having from 1 to 7 carbon atoms) is advantageously realized in the presence of a catalyst having a palladium base, which is all the more unexpected since this metal is known as easily causing isomerization. The palladium catalyst can be used in either the form of palladized carbon black or deposited on another support such as barium sulfate, calcium sulfate, strontium sulfate. The hydrogenation can be conducted at room temperatures and at acidic to neutral reaction conditions. If Compound III is formed, where R' represents an acyl radical as defined above, it is subjected to the treatment with an alkali metal hydroxide in aqueous or aqueous-alcoholic solution in order to obtain Compound with R'=H.

Dextrorotatory 1β - OR' - 5 - oxo - 4 - (2' - carboxyethyl) - 7aβ - lower alkyl - 3aα,4β5,6,7,7a - hexahydroindane, III, is lactonized by treatment with an acid anhydride or acid chloride of an organic carboxylic acid having from 1 to 7 carbon atoms, for example, a lower alkanoic acid anhydride such as acetic acid anhydride or propionic acid anhydride, or a lower alkanoic acid chloride such as acetyl chloride and the reaction occurs, in the case of the acid anhydride in the presence of a moderately basic agent, such as an alkali metal acetate or triethylamine at temperatures up to the reflux temperature. The reaction of Compound III in a form of a free alcohol (R'=H) leads to the corresponding ester of the anhydride employed, for example, to the acetate or to the propionate of the enolic lactone, IV, which is convenient to keep for the following steps of the process as the alcohol group is protected.

The Grignard reaction on the enolic lactone, IV, can be easily executed by utilizing 4-oxo-pentyl-magnesium halide whose ketone function has been previously transformed into a ketal, chosen preferably from the group of ethylene or propylene ketals or dimethyl or diethyl ketal. The halide is preferably the bromide, chloride or iodide. This reaction is conducted in an inert organic solvent, advantageously in tetrahydrofuran or even, but with slightly inferior yields, in an aliphatic ether such as ethyl ether or butyl ether, or, if desired, in the presence of a third common solvent, such as benzene or toluene. The reaction occurs at temperatures from about −75° C. to about 0° C.

The alkaline agent employed in treating the product of the Grignard reaction can be an alkali metal hydroxide in aqueous solution or an aqueous-alcoholic solution, as for example, sodium hydroxide or potassium hydroxide in an aqueous or aqueous-ethanolic solution. The reaction occurs at temperatures up to the reflux temperature.

The acid hydrolysis of the ketal function is easily performed with the aid of aqueous acetic acid or a dilute hydrochloric acid at slightly elevated temperatures.

The cyclization of 13β-lower alkyl-seco-$\Delta^{9,(10)}$-gonene-17β-ol-3,5-dione (V, R'''=H) into the corresponding 13β-lower alkyl-$\Delta^{4,9}$-gonadiene-17β-ol-3-one is preferentially realized with the aid of an alkali metal tertiary alcoholate, for example, sodium t-amylate, in a benzenic hydrocarbon solvent such as benzene or toluene.

The isomerization of 13β-lower alkyl-$\Delta^{4,9}$-gonadiene-17β-ol-3-one is advantageously effected, after previous esterification of the hydroxyl in the 17-position into the acetoxy ester, by acetyl bromide in the presence of acetic acid anhydride. The reaction is conducted in the cold and the diacetate of 13β-lower alkyl-$\Delta^{1,3,5(10)}$-gonatriene-3, 17β-diol or 18-nor-13β-lower alkyl-estradiol (Compound VIII with R'=COCH$_3$), is obtained.

The starting 2-lower alkyl-cyclopentane-1,3-diones can be prepared according to the process described in copending, commonly-assigned United States Patent application Ser. No. 361,877 filed concurrently herewith.

This patent application describes a process of subjecting a di-lower alkyl ester of a lower alkanoyl-succinic acid to the action of an alkaline agent in an aprotic solvent media, the corresponding 4-carbalkoxy-2-lower alkyl-cyclopentane-1,3-dione is recovered and transformed by saponification of the ester function followed by decarboxylation into the desired 2-lower alkyl-cyclopentane-1,3-dione.

The following examples are illustrative of the invention. It is to be understood, however, that other expedients known to those skilled in the art may be employed and the examples are not, therefore, to be deemed limitative.

EXAMPLE I

17β-benzoyloxy-$\Delta^{4,9}$-estradiene-3-one (VI, Y=CH$_3$, R'''=COC$_6$H$_5$)

STEP A.—PREPARATION OF RACEMIC 1,5-DIOXO-4-(2'-CARBOXYETHYL)-7a-METHYL - 5,6,7,7a-TETRAHYDRO-INDANE (I, WITH Y=CH$_3$, R=H)

63.9 gm. of methyl 5-oxo-6-heptenoate and 45.9 gm. of 2-methyl-cyclopentane-1,3-dione were introduced into a mixture of hydroquinone, 32 cc. of anhydrous pyridine and 140 cc. of anhydrous toluene. The mixture was heated to reflux under an atmosphere of nitrogen for a period of sixteen hours. The solvents were distilled therefrom under vacuum and the residue was taken up with 550 cc. of 5 N hydrochloric acid and heated in a steam bath for a period of 30 minutes.

After cooling, the solution was saturated with ammonium sulfate and extracted with chloroform. The chloroformic extracts were washed with a 50% solution of ammonium sulfate, dried over magnesium sulfate and evaporated to dryness under vacuum. The oily residue was introduced into hot isopropyl ether. The solution was cooled in an ice bath and the precipitate was vacuum filtered, washed with isopropyl ether and dried in air.

85.3 gm. of raw 1,5-dioxo-4-(2'-carboxy-ethyl)-7α-methyl-5,6,7,7α-tetrahydro-indane (I, Y=CH$_3$, R=H) were obtained. This product was heated to reflux in 170 cc. of methylethyl ketone. The solution was allowed to cool and stand one hour in a bath of methanol and ice. The precipitate was vacuum filtered, washed with methylethyl ketone and then with isopropylether and dried in air. 79.15 gm. of pure racemic 1,5-dioxo-4-(2'-carboxyethyl)-7α-methyl - 5,6,7,7α - tetrahydro-indane (I, with Y=CH$_3$, R=H) were obtained having a melting point of 126–127° C. Purification yield: 93%. Overall yield: 82%.

The product occurred in the form of small colorless prismatic blocks and was soluble in ethanol and chloroform, fairly soluble in water and ethyl acetate, and slightly soluble in sulfuric ether, isopropyl ether, benzene, toluene, methylethyl ketone and butanol.

*Analysis.*—C$_{13}$H$_{16}$O$_4$; molecular weight=236.26. Calculated: C, 66.08%; H, 6.83%. Found: C, 65.8%; H, 6.7%.

This product is not described in the literature.

As a variant of the operatory method described above, 1,5-dioxo-4(2'-carbomethoxyethyl) - 7α - methyl-5,6,7,7α-tetrahydro-indane (I, with Y=CH$_3$, R=CH$_3$) was prepared in the following fashion:

A solution of 16 gm. of methyl 5-oxo-6-heptenoate and 11.2 gm. of 2-methyl-cyclopentane-1,3-dione were heated to reflux for a period of 16 hours under an atmosphere of nitrogen in 8 cc. of pyridine, 35 cc. of toluene and 150 mg. of hydroquinone.

The solution was cooled, diluted with benzene and washed successively with hydrochloric acid, water and a saturated solution of sodium bicarbonate. The organic phase was dried over magnesium sulfate and then evaporated to dryness under vacuum.

23.25 gm. of a yellow oil were obtained.

9.4 gm. of the above product were dissolved in 70 cc. of benzene. 500 mg. of p-toluene sulfonic acid monohydrate were added and the reaction mixture was heated to reflux for a period of five hours. After cooling, the mixture was diluted with ether, washed with water, then with a saturated solution of sodium carbonate. The organic phase was dried next over magnesium sulfate and evaporated to dryness under vacuum.

6.5 gm. of a product were recovered which product was dissolved in 6.5 cc. of sulfuric ether. The solution was cooled and 13 cc. of isopropyl ether were added thereto. The cooling in an ice bath was continued for one hour. The precipitate was separated, washed with isopropyl ether and dried in air. The product obtained was dissolved at reflux in 60 cc. of ether. After cooling and icing, the precipitate was vacuum filtered, washed with a mixture of ethyl ether and isopropyl ether (1:2) and dried in air.

4.31 gm. of racemic 1,5-dioxo-4-(2'-carbomethoxyethyl)-7α-methyl - 5,6,7,7α - tetrahydro - indane (I, with Y=CH$_3$, R=CH$_3$) were obtained having a melting point of 76° C. which product occurred in the form of colorless prisms, soluble in alcohol, acetone, benzene and chloroform, slightly soluble in the cold in ether, slightly soluble in hot water and insoluble in water.

*Analysis.*—C$_{14}$H$_{18}$O$_4$; molecular weight=250.28. Calculated: C, 67.18%; H, 7.25%. Found: C, 67.3%; H, 7.3%.

This product is not described in the literature.

3.22 gm. of 1,5-dioxo-4-(2'-carbomethoxyethyl)-7α-methyl-5,6,7,7α-tetrahydro-indane were heated in a steam bath for a period of 45 minutes in 25 cc. of dilute hydrochloric acid. After cooling, the solution was saturated with ammonium sulfate. The product crystallized. The solids were extracted with methylene chloride. The methylene chloride solution was washed with a solution of ammonium sulfate, dried over magnesium sulfate and evaporated to dryness under vacuum. The product obtained was added to ether, iced, vacuum filtered, washed with ether and dried in air.

2.54 gm. of racemic 1,5-dioxo-4-(2'-carboxyethyl)-7α-methyl-5,6,7,7α-tetrahydro-indane (I, with Y=CH$_3$, R=H) were obtained having a melting point of 126–127° C., identical to the product obtained precedingly.

STEP B.—RESOLUTION OF RACEMIC 1,5-DIOXO-4-(2'-CARBOXYETHYL)-7α-METHYL - 5,6,7,7α-TETRAHYDRO-INDANE (I, Y=CH$_3$, R=H)

(1) Formation of the ephedrine salt.—11.8 gm. of the racemic acid and 8.66 gm. of 1-ephedrine were introduced into 175 cc. of benzene. The reaction mixture was heated until solution occurred, then allowed to cool to room temperature. The ephedrine salt crystallized slowly. The salt was vacuum filtered, washed with benzene and dried in air.

The ephedrine salt was recrystallized from benzene and then from methyl acetate and 7.96 gm. of a white salt (the dextrorotatory salt of 1-ephedrine and 1,5-dioxo-4-(2' - carboxyethyl) - 7αβ - methyl - 5,6,7,7α - tetrahydro-indane) were obtained having a melting point of 150–151° C. Yield: 79.4%.

The product occurred in the form of white hexagonal prisms and platelets and was soluble in water, alcohol, acetone, benzene and chloroform and slightly soluble in ether. Specific rotation $[α]_D^{20}=+108°±1°$ (c.=1% in water).

This product is not described in the literature.

(2) Preparation of dextrorotatory 1,5-dioxo-4-(2'-carboxyethyl)-7αβ-methyl-5,6,7,7α-tetrahydro-indane (I, with Y=CH$_3$, R=H) starting from its ephedrine salt.—42.93 gm. of the dextrorotatory ephedrine salt obtained according to the preceding step were heated to reflux in 1,000 cc. of acetone. Next, 7.425 gm. of crystallized oxalic acid, containing 2 mols of water of crystallization, dissolved in 50 cc. of acetone, were added slowly. The refluxing was maintained for a period of one hour and the ephedrine oxalate, which precipitated, was recoverd. Next, the acetone was removed under vacuum. The residue was triturated with water, vacuum filtered, washed with ice water, dried in air and then in an oven. 24.13 gm. of dextrorotatory 1,5 - dioxo - 4 - (2' - carboxyethyl - 7αβ-methyl-5,6,7,7α-tetrahydro-indane (IA, Y=CH$_2$) were obtained. Yield with reference to the racemic compound: 75.8%. Melting point 143–143.5° C. Specific rotation $[α]_D=+242°$ (c.=1% in acetone). The product occurred in the form of prisms and was soluble in alcohol, acetone, benzene, chloroform and dilute aqueous acids and alkalis, and slightly soluble in ether and water.

*Analysis.*—C$_{13}$H$_{16}$O$_4$: molecular weight=236.26. Calculated: C, 66.08%; H, 6.83%. Found: C, 65.9%; H, 6.7%.

This product is not described in the literature.

STEP C (1) Preparation of 1β-hydroxy-5-oxo-4-(2'-carboxyethyl)-7αβ-methyl-5,6,7,7α-tetrahydro-indane, (II, with Y=CH$_3$, R'=H).—The following mixture was agitated under an atmosphere of nitrogen: 15.34 gm. of dextrorotatory 1,5 - dioxo - 4 - (2' - carboxyethyl) - 7αβ - methyl-5,6,7,7α-tetrahydro-indane (IA, Y=CH$_3$), 75 cc. of water and 66 cc. of N sodium hydroxide. Agitation was continued until total dissolution occurred. The interior temperature was maintained at about 2° C. and 688 mg. of sodium borohydride in 10 cc. of water were introduced. Then 8 cc. of concentrated hydrochloric acid were introduced. The reaction mixture was agitated for 20 minutes in an ice bath. Then the precipitate was vacuum filtered, washed with water, dried and recrystallized from water.

15.35 gm. of 1β-hydroxy-5-oxo-4-(2'-carboxyethyl)-7αβ-methyl-5,6,7,7α-tetrahydro-indane monohydrate (II, with Y=CH₃, R'=H) were obtained. Yield: 92%. Specific rotation $[\alpha]_D^{20} = +31.5° \pm 1°$ (c.=1% in acetone).

The product occurred in the form of white prismatic needles and was soluble in alcohol, acetone, benzene and chloroform, and slightly soluble in cold water.

*Analysis.*—Dehydrated product: $C_{13}H_{18}O_4$; molecular weight=238.27. Calculated: C, 65.53%; H, 7.61%. Found: C, 65.7%; H, 7.6%.

This product is not described in the literature.

(2) Preparation of 1β-formyloxy-5-oxo-4-(2'-carboxyethyl)-7aβ-methyl-5,6,7,7a-tetrahydro - indane, (II, with Y=CH₃, R'=HCO)—4.42 gm. of 1β-hydroxy-5-oxo-4-(2'-carboxyethyl)-7aβ-methyl-5,6,7,7a-tetrahydro - indane monohydrate (II with Y=CH₃, R'=H), 0.22 gm. of p-toluene sulfonic acid, and 22 cc. of pure formic acid were heated in a water bath for a period of 30 minutes. The solution was cooled to room temperature and 33 cc. of an aqueous solution of ammonium sulfate was added. The formate crystallized.

The reaction mixture was maintained for one hour in an ice bath. The precipitate was vacuum filtered, washed with ammonium sulfate solution and with ice water and dried.

After purification by recrystallization from methylethyl ketone, 2.75 gm. of 1β-formyloxy-5-oxo-4-(2'-carboxyethyl)-7aβ-methyl-5,6,7,7α - tetrahydro - indane (II with Y=CH₃, R'=HCO) were obtained having a melting point of 124° C. and a specific rotation $$[\alpha]_D = -5° \pm 1°$$

(c.=1% in acetone).

The product occurred in the form of white, hexagonal prisms and was soluble in water, alcohol, ether acetone, benzene and chloroform.

*Analysis.*—$C_{14}H_{18}O_5$: molecular weight=266.28. Calculated: C, 63.14%; H, 6.81%. Found: C, 63.3%; H, 6.8%.

The product is not described in the literature.

STEP D.—PREPARATION OF DEXTROROTATORY 1β-HYDROXY - 5 - OXO-4-(2'-CARBOXYETHYL)-7aβ-METHYL 3aα,4β,5,6,7a-HEXAHYDRO-INDANE (III WITH Y=CH₃, R'=H)

0.718 gm. of 1β-formyloxy-5-oxo-4-(2'-carboxyethyl)-7aβ-methyl-5,6,7,7a-tetrahydro-indane, (II with Y=CH₃, R'=HCO) were dissolved in 7 cc. of acetic acid and hydrogenated while agitating in the presence of palladized carbon black for a period of two hours and fifteen minutes. After absorption of the theoretical amount of hydrogen, the catalyst was removed from the solution by filtration. Then the filtrate was evaporated to dryness under vacuum. The residue was taken up by a mixture of methanol and methanolic potassium hydroxide and a small amount of water and heated to reflux for a period of 15 minutes. Then hydrochloric acid was added and the methanol was removed under vacuum.

The oily residue was extracted with chloroform. The chloroformic extracts were combined, washed with water, dried over magnesium sulfate and distilled to dryness under vacuum. The residue was crystallized from ether and a first yield of 0.275 gm. of dextrorotatory 1β-hydroxy-5-oxo-4-(2' - carboxyethyl)-7aβ-methyl-3aα,4β,5,6, 7,7a-hexahydro-indane (III with Y=CH₃, R'=H) were obtained. The product was recrystallized from water and had a melting point of 153° C. and a specific rotation $[\alpha]_D^{20} = +12°$ (c.=1% in ethanol).

The product occurred in the form of colorless prisms, soluble in alcohol, and slightly soluble in ether, benzene and chloroform.

*Analysis.*—$C_{13}H_{20}O_4$; molecular weight=240.29. Calculated: C, 64.98%; H, 8.39%. Found: C, 64.7%; H, 8.4%.

The product is not described in the literature.

Dextrorotatory 1β-acetoxy-5-oxo-4-(2'-carboxyethyl)-7aβ-methyl-3aα,4β,5,6,7,7a-hexahydro-indane (III, with Y=CH₃, R'=COCH₃) melted at 142° C.–143° C. and had a specific rotation $[\alpha]_D^{20} = +9°$ (c.=1% in chloroform).

This product is not described in the literature.

STEP D¹.—DIRECT PREPARATION OF DEXTROROTATORY 1β-HYDROXY-5-OXO-4-(2'-CARBOXYETHYL)-7aβ-METHYL-3aα,4β,5,6,7,7a - HEXAHYDRO - INDANE (III, WITH Y=CH₃, R'=H) STARTING FROM 1β-HYDROXY-5-OXO-4-(2'-CARBOXYETHYL) - 7aβ - METHYL-5,6,7,7a-TETRAHYDRO-INDANE (II, WITH Y=CH₃, R'=H)

5.12 gm. of 1β-hydroxy-5-oxo-4-(2'-carboxyethyl)-7aβ-methyl-5,6,7,7a-tetrahydro-indane monohydrate (II, with Y=CH₃, R'=H) were dissolved in 100 cc. of a 70% alcoholic solution and the solution was hydrogenated while agitating in the presence of palladized carbon black until the absorption of hydrogen ceased. The catalyst was removed by filtration and the filtrate was evaporated to dryness under vacuum. 50 cc. of ether were added to the residue and the mixture was heated to reflux for a period of several minutes. After cooling, the crystals which formed were vacuum filtered, washed with ether and dried. After recrystallization from water, 2.2 gm. of pure dextrorotatory 1β - hydroxy-5-oxo-4-(2'-carboxyethyl)-7aβ-methyl-3aα,4β,5,6,7,7a-hexahydro-indane (III, with Y=CH₃, R'=H) were recovered having a melting point of 153° C. and a specific rotation $[\alpha]_D^{20} = +12°$ (c.=1% in ethanol), corresponding to the compound obtained according to preceding Step D.

STEP E.—PREPARATION OF THE δ-LACTONE OF DEXTROROTATORY 1β-ACETOXY-4-(2'-CARBOXYETHYL)-5-HYDROXY-7aβ-METHYL-3aα,4β,7,7a-TETRAHYDRO - INDANE (IV, WITH Y=CH₃, R''=COCH₃)

1.7 gm. of dextrorotatory 1β-hydroxy-5-oxo-4-(2'-carboxyethyl) - 7aβ - methyl-3aα,4β,5,6,7,7a-hexahydro-indane (III, Y=CH₃, R'=H), 0.850 gm. of powdered sodium acetate and 25 cc. of acetic acid anhydride were heated to reflux for a period of 4 hours under an atmosphere of nitrogen. Next the excess of acetic acid anhydride and the acetic acid formed were distilled from the reaction mixture under vacuum. The oil residue was dissolved in sulfuric ether. The organic solution was washed with water and with aqueous sodium bicarbonate, dried over magnesium sulfate and the solvent was distilled therefrom under vacuum. The residue was dissolved in hot isopropyl ether and the solution was concentrated to a small volume. The precipitate formed was vacuum filtered, washed with isopropyl ether and dried in air.

1.5 gm. of the δ-lactone of dextrorotatory 1β-acetoxy-4 - (2'-carboxyethyl)-5-hydroxy-7aβ-methyl-3aα,4β,7,7a-tetrahydro-indane (IV, with Y=CH₃, R''=COCH₃) were obtained having a melting point of 118° C. This product occurred in the form of colorless prisms, soluble in benzene and chloroform, fairly soluble in alcohol, slightly soluble in ether and insoluble in water.

*Analysis.*—$C_{15}H_{20}O_4$; molecular weight=264.31. Calculated: C, 68.16%; H, 7.63%. Found: C, 68.3%; H, 7.6%.

This product is not described in the literature.

STEP F.—DEXTROROTATORY - 17β - BENZOYLOXY-4,5-SECO-Δ⁹-ESTRENE-3,5-DIONE (V WITH Y=CH₃, R'''=COC₆H₅)

(1) Preparation of the magnesium compound.—486 mg. of grated magnesium and 5 cc. of tetrahydrofuran were placed in a 50 cc. balloon flask provided with a condenser, a nitrogen inlet, an introduction ampule and magnetic agitation. A solution of 4.18 gm. of 2-methyl-(3'-bromopropyl-1,3-dioxolane in 12.5 cc. of tetrahydrofuran were placed in the introduction ampule. Under a current of nitrogen and under good agitation, 1 to 2 cc. of the solution of 2-methyl-(3'-bromopropyl)-1,3-dioxolane were introduced. Then 2 to 3 drops of methyl iodide were intrduced. Next, the rest of the solution was introduced while cooling and the reaction mixture was heated to reflux for a period of 30 minutes at about 60°

C. The reaction mixture was cooled to room temperature and 21–22 cc. of an 0.75 N solution of 4,4-ethylenedioxy-pentyl-magnesium bromide were obtained.

(2) Grignard reaction.—2.64 gm. of the δ-lactone of dextrorotatory 1β-acetoxy-4-(2'-carboxyethyl)-5-hydroxy-7aβ-methyl-3aα,4β,7,7a-tetrahydro-indane (IV with Y=CH$_3$, R''=COCH$_3$)

were dissolved in 30 cc. of tetrahydrofuran. The solution was cooled to about −60° C. and in an atmosphere of nitrogen. Then very slowly 15 cc. of the above 4,4 - ethylene - dioxy-pentyl-magnesium bromide solution were added. The reaction mixture was agitated while cooling for a period of one hour. Then the temperature was allowed to mount toward −30° C. and several cc. of a dilute solution of ammonium sulfate were added. The reaction mixture was extracted with sulfuric ether. The ethereal extracts were combined, washed with water, dried over magnesium sulfate and evaporated to dryness under vacuum.

(3) Alkaline treatment.—To the residue obtained above, 20 cc. of 2 N methanolic potassium hydroxide, 6 cc. of methanol and 4 cc. of water were added. The reaction mixture was heated to reflux for a period of one hour in an atmosphere of nitrogen. Thereafter, the reaction mixture was neutralized with acetic acid and the methanol was removed under vacuum. An oily residue was obtained which was used as such for the following step of the synthesis.

(4) Acid hydrolysis.—The oily residue, obtained above, was taken up in 30 cc. of acetic acid and 10 cc. of water and heated in a steam bath for a period of one hour.

The solution was evaporated to dryness under vacuum and the residue was taken up with water and ether. The decanted organic phase was washed with a saturated solution of sodium bicarbonate, then with water, dried over magnesium sulfate and evaporated to dryness under vacuum. A residual oil was obtained which was raw 17β-hydroxy-4,5-seco-Δ$^9$-estrene-3,5-dione (V, with Y=CH$_3$, R'''=H).

This product is used directly for the esterification in the 17-position.

In order to obtain pure 17β-hydroxy-4,5-seco-Δ$^9$-estrene-3,5-dione (V, with Y=CH$_3$, R'''=H), the oily residue was taken up in 20 cc. of methylene chloride. The organic phase was washed with 5 cc. of a saturated aqueous solution of sodium bicarbonate and the aqueous extract was extracted two times with 10 cc. aliquots of methylene chloride. The organic solutions were combined, dried over magnesium sulfate, treated with animal charcoal and evaporated to dryness under vacuum. An oil was obtained which was taken up in 5 cc. of ether. The solution was allowed to stand two days at rest at ordinary temperature. Next, after cooling to −20° C., the crystals formed were vacuum filtered and washed with ether.

The pure 17β - hydroxy - 4,5-seco-Δ$^9$-estrene-3,5-dione (V, with Y=CH$_3$, R'''=H) thus obtained melted at 95° C. and had a specific rotation $[\alpha]_D^{20}$=−34°±2° (c.=1% in methanol).

U.V. Spectra: λ max. 249–250 mμ, ε=14,700.

This product was fairly soluble in water and ether, and soluble in methanol, ethanol, acetone, benzene and chloroform.

This product is not described in the literature.

(5) Esterification.—The raw 17β-hydroxy-4,5-seco-Δ$^9$-estrene-3,5-dione, obtained in Step F-4 above, was dissolved in 20 cc. of benzene. 3 cc. of pyridine and 2 cc. of benzoyl chloride were added thereto and the reaction mixture was heated in a steam bath for a period of 30 minutes. After cooling, a saturated solution of sodium bicarbonate was added and the reaction mixture was extracted with sulfuric ether.

The organic extract was washed successively with sodium bicarbonate solution, water, hydrochloric acid solution and water. It was dried over magnesium sulfate and evaporated to dryness under vacuum.

The residue was dissolved in 12 cc. of hot isopropyl ether and 2 cc. of petroleum ether was added thereto. The solution was cooled for a period of two hours. The precipitate was vacuum filtered, washed with a mixture of isopropyl ether and petroleum ether (10:3) and dried in air.

1.37 gm. of dextrorotatory 17β-benzoyloxy-4,5-seco-Δ$^9$-estrene-3,5-dione (V, with Y=CH$_3$, R'''=COC$_6$H$_5$) were obtained having a melting point of 117–118° C. and a specific rotation $[\alpha]_D^{20}$=+43°±!° (c.=1% in methanol). This product was described by Velluz et al. (Comptes Rendus de l'Ac. des Sciences, 1960, 250, p. 1510).

EXAMPLE II

17β-benzoyloxy-Δ$^{4,9}$-estradiene-3-one can be obtained as disclosed in U.S. Patent 3,056,811 by operating in the following manner.

1.25 cc. of a 1.52 N toluene solution of sodium t-amylate were introduced into a solution of 0.715 gm. of dextrorotatory 17β-benzoyloxy-4,5-seco-Δ$^9$-estrene-3,5-dione (V, with Y=CH$_3$, R'''=COC$_6$H$_5$) in 9 cc. of toluene. The mixture was heated to 100° C. under an atmosphere of nitrogen for a period of several minutes. Next, the reaction mixture was cooled, neutralized with acetic acid and concentrated to a small volume. The concentrated solution was poured into water. The aqueous solution was extracted with methylene chloride. The extracts, after drying over sodium sulfate and filtering, furnished, by evaporation to dryness, a residue of 0.70 gm. which was recrystallized from ether. The product was purified by subjecting it to chromatography through silica gel and elution with methylene chloride containing 1.5% of acetone. After recrystallization from isopropyl ether, 0.55 gm. of 17β-benzoyloxy-Δ$^{4,9}$-estradiene-3-one (VI, with Y=CH$_3$, R'''=COC$_6$H$_5$) were obtained having a melting point of 156° C. and a specific rotation $[\alpha]_D^{20}$=−73.5° (c.=0.5% in methanol).

EXAMPLE III

17β - benzoyloxy - 4,5 - seco - Δ$^9$ - estrene-3,5-dione (V, with Y=CH$_3$, R'''=COC$_6$H$_5$) by hydrogenation and cyclization in a hydrochloric media (according to Velluz et al., Angewandte Chemie, 1960, pp. 725–730) led with a yield in the neighborhood of 90%, to the benzoate of 19-nor testosterone by operating as follows:

0.55 gm. of dextrorotatory 17β-benzoyloxy-4,5-seco-Δ$^9$-estrene-3,5-dione (V, with Y=CH$_3$, R'''=COC$_6$H$_5$) were dissolved in 40 cc. of 95% ethanol. The solution was added to a suspension of 40 mg. of palladized carbon containing 15% of palladium hydroxide in 5 cc. of 95% of ethanol. Next, a solution containing 10% of triethylamine in ethanol was added until a pH of 11 was obtained. Then the reaction mixture was agitated under hydrogen for a period of an hour and a half. The reaction mixture was filtered, the filtrate was evaporated to dryness under vacuum and the residue was crystallizated from isopropyl ether. 3 - methyl-7-keto-8-(3'-oxobutyl)-3,4-[3'-benzoyl-oxy-cyclopentano (2',1')]decahydronaphthalene was obtained having a melting point of 114° C. and a specific rotation $[\alpha]_D^{20}$=−48° (c.=1% in methanol) with a yield of 95%. 0.175 gm. of this product was introduced into 3.5 cc. of acetic acid containing 0.22 cc. of pure hydrochloric acid. The reaction solution was allowed to stand under an atmosphere of nitrogen at room temperature for a period of 16 hours. Next, 15 cc. of a 5% solution of sodium carbonate were added. The aqueous solution was extracted several times with methylene chloride. The extracts were combined, washed with water, dried over sodium sulfate and evaporated to dryness under vacuum. 0.168 gm. of the raw benzoate of 19-nor-testosterone were recovered which product was purified by recrystallization from isopropyl ether, then from ethyl acetate. There was obtained, with a yield of 95% with reference to the decahydronaphthalenic derivative, the pure benzoate of 19-nor-testosterone (VII, with Y=CH$_3$, R$^{IV}$=COC$_6$H$_5$) having a melting point of 176° C. and a specific rotation [α]$_D^{20}$=+106° (c.=1% in ethanol).

EXAMPLE IV

17θ-hydroxy - 4,5 - seco-Δ-estrene-3,5-dione (V, with Y=CH$_3$, R'''=H) could, on the other hand, be cyclized directly into Δ$^{4,9}$-estradiene 17θ-ol-3-one (VI, with Y=CH$_3$, R'''=H) by operating as follows:

1 gm. of 17β-hydroxy-4,5-seco-Δ$^9$-estrene-3,5-dione (V with Y=CH$_3$, R'''=H) were introduced into 5 cc. of anhydrous toluene. The reaction mixture was agitated under nitrogen for a period of several minutes. Then 2.3 cc. of a toluene solution containing 1.8% of sodium t-amylate was slowly added while agitating and under nitrogen. In the course of the reaction, a yellow precipitate was formed. Then the reaction became fluid and was transformed into a suspension. The agitation was continued for a period of four hours under nitrogen. Then 0.15 cc. of acetic acid was added. The suspension was cooled for a period of one hour at 0° C. The precipitate was vacuum filtered, washed two times, each time with 1 cc. of iced toluene, then with water and dried at 60° C. After recrystallization from methylethyl ketone, pure Δ$^{4,9}$-estradiene-17β-cl-3-one (VI, with Y=CH$_3$, R'''=H) was obtained with a yield of 86%. The product had a melting point of 190° C. and a specific rotation [α]$^{20}$$_D$=−306°±3° (c.=0.5% in methanol).

EXAMPLE V

The Δ$^{4,9}$-estradiene-17β-ol-3-one (VI, with Y=CH$_3$, R'''=H) could be esterfied into 17β-benzoyloxy-Δ$^{4,9}$-estradiene-3-one (VI, with Y=CH$_3$, R'''=COC$_6$H$_5$) by operating as follows:

0.35 gm. of Δ$^{4,9}$-estradiene-17β-ol-3-one (VI, with Y=CH$_3$, R'''=H) were introduced into 1.4 cc. of pyridine and the suspension formed was cooled, under agitation, to a temperature of about 0° C. Next, while maintaining the temperature at 0° C., a solution of 0.53 cc. of benzoyl chloride in 0.7 cc. of pyridine was introduced slowly. The agitation was maintained for a period of two and a half hours at 0° C. while the 17β-benzoyloxy-Δ$^{4,9}$-estradiene-3-one crystallized. The reaction mixture was cooled to −5° C. and 0.44 cc. of pure formic acid were introduced. The agitation was continued for a period of 15 minutes during which the temperature rose to 10° C. Then, the reaction mixture was poured into 30 cc. of a mixture of water and ice containing 1.75 gm. of sodium bicarbonate. The precipitate formed was vacuum filtered, washed with water until the wash waters were neutral, extracted three times with 0.8 cc. of isopropyl ether and the raw compound (VI, with Y=CH$_3$, R'''=COC$_6$H$_5$) obtained was dried. The purification of this compound was effected by dissolution at reflux in 3.1 cc. of absolute ethanol and vacuum filtering after cooling to −10° C. The crystallized product was washed at −10° C. with absolute ethanol and dried at 80° C. 17β-benzoyloxy-Δ$^{4,9}$-estradiene-3-one (VI, with Y=CH$_3$, R'''=COC$_6$H$_5$) was obtained in pure form identical to the product described above.

EXAMPLE VI

Preparation of 13β-ethyl-Δ$^{1,3,5(10)}$-gonatriene-3,17β-diol or 18-nor-13β-ethyl-estradiol (Compound VIII with Y=C$_2$H$_5$ and R'=H) and 13β-n-propyl-Δ$^{1,3,5(10)}$-gonatriene-3, 17β-diol or 18-nor-13β-n-propylestradiol (Compound VIII with Y=—CH$_2$—CH$_2$—CH$_3$ and R'=H)

STEP A.—RACEMIC 1,5-DIOXO-4-(2'-CARBOXYETHYL)-7a-ETHYL - 5,6,7,7a - TETRAHYDRO-INDANE (I, WITH Y=—CH$_2$—CH$_3$, AND R'=H)

100 gm. of 2-ethyl-cyclopentane-1,3-dione (product described in United States Patent Application Ser. No. 361,877 were introduced at room temperature while agitating under atmosphere of nitrogen in 25 cc. of pyridine. 158 gm. of methyl 5-oxo-heptenoate were added thereto and the reaction mixture was heated for a period of three hours at about 115–125° C. Next, 500 cc. of 2.5 N hydrochloric acid solution were added to the reaction mixture. Then over a period of 90 minutes, a volume of 300 cc. was distilled from the solution.

The reaction mixture was cooled to room temperature and extracted with methylene chloride. The organic phase was dried, filtered over animal carbon black and evaporated to dryness. The product obtained was crystallized from refluxing toluene, then from methyl-ethyl-ketone, iced to −10° C. 139 gm. of racemic 1,5-dioxo-4-(2'-carboxyethyl) - 7a-ethyl-5,6,7,7a-tetrahydro - indane (I, Y=C$_2$H$_5$, R'=H), having a melting point of 119.5° C., were obtained.

The compound occurred in the form of colorless prisms and was very slightly soluble in ether and soluble in alcohols and chloroform.

*Analysis.*—C$_{14}$H$_{18}$O$_4$; molecular weight=250.28, Calculated: C, 67.18%; H, 7.24%. Found: C, 67.3%; H, 7.3%. U.V. Spectra in ethanol: λ max. at 250–251 mμ ε=11,000.

This product is not described in the literature.

In an analogous manner by condensation of methyl 5-oxo-heptenoate with 2-n-propyl-cyclopentane-1,3-dione the racemic 1,5 - dioxo-4-(2'-carboxyethyl)-7a-propyl-5,6,7,7a - tetrahydro indane (I, Y=CH$_2$—CH$_2$—CH$_2$, R'=H) was obtained This product was isolated in the form of an oil and had a U.V. Spectra in ethanol containing N/1000 sodium hydroxide: λ max. at 254–255 mμ ε=14,200.

This compound is not described in the literature.

STEP B.—RESOLUTION OF 1,5-DIOXO-4-(2'-CARBOXYETHYL)-7a-ETHYL-5,6,7,7a-TETRAHYDRO-INDANE (I, WITH Y=—CH$_2$—CH$_3$, R'=H)

(1) Formation of the ephedrine salt.—1.3 kg of racemic 1,5-dioxo-4-(2'-carboxyethyl)-7a-ethyl-5,6,7,7a-tetrahydro-indane (I, with Y=C$_2$H$_5$, R'=H) were placed in suspension at room temperature in 2.6 liters of benzene. Thereafter over a period of 30 minutes, 3.85 liters of a solution of 1-ephedrine in benzene containing 223 gm. of the base per liter were added and the reaction mixture was allowed to remain under agitation for a period of 3 days under an atmosphere of nitrogen.

The precipitate was vacuum filtered and washed. The product recovered was triturated with benzene, and recrystallized from methyl-ethyl-ketone. 680 gm. of a salt were obtained having a specific rotation $$[\alpha]_D^{20}=+87°\pm2°$$

(c.=1% in alcohol).

The compound occurs in the form of colorless prisms soluble in water, alcohol and chloroform and slightly soluble in acetone.

This product is not described in the literature.

(2) Preparation of dextrorotatory 1,5-dioxo-4-(2'-carboxyethyl)-7a-ethyl-5,6,7,7a-tetrahydroindane (I, with Y=—CH$_2$—CH$_3$, R'=H) starting from the ephedrine salt. The salt precedingly obtained was placed in suspension in 2 liters of acetone. The reaction mixture was heated to reflux. A solution of 110 gm. of oxalic acid in 600 cc. of acetone were added over a period of one hour. The refluxing was maintained for a further period of one hour.

The precipitate was vacuum filtered and washed with boiling acetone. The filtrate was combined with the wash liquor and evaporated to drynes. The residue was taken up in hot water, then cooled to 0° C. The precipitate was vacuum filtered, washed with water and dried. 400 gm of dextrorotatory 1,5-dioxo-4-(2'-carboethyl)-7αβ-ethyl-5,6-7,a-tetrahydro-indane (IA, with Y =—CH$_2$—CH$_3$) were obtained which, when recrystallized from methyl-ethylketone, melted at 146–148° C and had a specific rotation $[\alpha]^{20}{}_D = +185° \pm 2°$ (c=1% in acetone).

The compound occurred in the form of colorless crystals, very slightly soluble in ether, water, alcohols, acetone and benzene and soluble in chloroform.

*Analysis.*—$C_{14}H_{18}O_4$; molecular weight=250.28. Calculated: C, 67.18%; H, 7.24%. Found: C, 67.4%; H, 7.3%. U.V. Spectra in a solution of N sodium hydroxide in ethanol:

$\lambda$ max at 254 m$\mu$ $\epsilon$=10,750.

This product is not described in the literature.

In an analogous manner the resolution by 1-ephedrine of racemic 1,5-dioxo-4-(2'-carboxyethyl)-7a-n-propyl-5,6,7,7a-tetrahydro-indane (I, with Y=—$CH_2$—$CH_2$—$CH_3$, R'=H) leads to the isolation of the dextrorotatory isomer of this compound (IA, Y=—$CH_2$—$CH_2$—$CH_3$).

Dextrorotatory 1,5-dioxo-4-(2'-carboxyethyl)-7a$\beta$-n-propyl-5,6,7,7a-tetrahydro-indane occurs in the form of yellow ocher crystals melting at 140° C and having a specific rotation $[\alpha]^{20} = +96°$ (c.=1% in ethanol) and is soluble in alcohol.

This compound is not described in the literature.

STEP C.—1$\beta$ - HYDROXY-5-OXO-4-(2'-CARBOXYETHYL)-7a$\beta$-ETHYL-5,6,7,7a-TETRAHYDRO-INDANE (II, WITH Y=—$CH_2$—$CH_3$, R'=H)

50 cc. of 2 N sodium hydroxide solution were added to 25 gm. of dextrorotatory 1,5-dioxo-4-(2'-carboxyethyl)-7a$\beta$-ethyl-5,6,7,7a-tetrohydro-indane (IA, with Y=—$CH_2$—$CH_3$) over a period of one-half hour and at room temperature.

1.56 gm. of potassium borohydride were introduced into the solution thus formed. The reaction mixture was agitated for 15 minutes, cooled to about 0° C. and 12 cc. of concentrated hydrochloric acid was added until the pH attained a value of 1 or 2.

The solution was scratched and agitated for a period of 2 hours at 0° C. The crystals were vacuum filtered, recrystallized from water and dried. 18 gm. of 1$\beta$-hydroxy-indane (II, with Y=—$CH_2$—$CH_3$, R'=H) were obtained which product decomposed toward 40° C and had a specific rotation $[\alpha]^{20}{}_D = +21° \pm 1°$ (c.=1% in acetone).

This compound occurred in the form of colorless needles, slightly soluble in water.

*Analysis.*—$C_{14}H_{20}O_4$; molecular weight=252.3. Calculated: C, 66.64%; H, 7.99%. Found: C, 66.5%; H, 8.2%.

This product is not described in the literature.

In an analogous manner, the reduction of the propylated homolog of compound IA leads to 1$\beta$-hydroxy-5-oxo-4-(2'-carboxyethyl)-7a$\beta$-n-propyl-5,6,7,7a-tetrahydro-indane (II, with Y=—$CH_2$—$CH_2$—$CH_3$, R'=H). This product occurs as colorless crystals melting at about 90° C. and is soluble in alcohol and acetone.

This compound is not described in the literature.

STEP D.—1$\beta$ - HYDROXY-5-OXO-4-(2'-CARBOXYETHYL)-7a$\beta$-ETHYL-3a$\alpha$,4$\beta$,5,6,7,7a-HEXAHYDRO - INDANE (III, WITH Y=—$CH_2$—$CH_3$, R'=H)

15 gm. of 1$\beta$-hydroxy-5-oxo-4-(2'-carboxyethyl)-7a$\beta$-ethyl-5,6,7,7a-tetrahydro-indane, (II, with Y=—$CH_2$—$CH_3$, R'=H) were dissolved at room temperature in a mixture of 120 cc. of acetone of 30 cc. of water. 7.5 gm. of 0.6% palladium hydroxide on barium sulfate were added thereto. The atmosphere in the reaction vessel was purged and a current of hydrogen was allowed to pass through the reaction mixture for a period of 6 hours.

Thereafter the catalyst was vacuum filtered. The acetone was removed by heating. Water was added to the reaction mixture and the reaction mixture was heated to reflux for a period of one hour. Next, the reaction mixture was distilled to dryness under vacuum and dehydrated by entrainment with benzene. 15 gm. of 1$\beta$-hydroxy-5-oxo-4-(2' - carboxyethyl)-7a$\beta$-ethyl-3a$\alpha$,4$\beta$,5,6,7,7a-hexahydro-indane (III, with Y=—$CH_2$—$CH_3$, R'=H) were obtained.

This compound was very slighty soluble in ether, slightly soluble in water, benzene and chloroform, and soluble in alcohols and acetone.

This product is not described in the literature.

In an anologous manner, catalytic hydrogenation of the propylated homolog of Compound II leads to 1$\beta$-hydroxy-5-oxo-4-(2' - carboxyethyl)-7a$\beta$-n-propyl-3a$\alpha$,4$\beta$,5,6,7,7a-hexahydro-indane (III, with Y=—$CH_2$—$CH_2$—$CH_3$, R'=H).

This compound is not described in the literature.

STEP E.—$\delta$-LACTONE OF 1$\beta$-ACETOXY-4-(2'-CARBOXYETHYL)-5-HYDROXY-7a$\beta$-ETHYL - 3a$\alpha$,4$\beta$,7,7a - TETRAHYDRO-INDANE (IV, WITH Y=—$CH_2$—$CH_3$, R'=COCH$_3$)

15 gm. of anhydrous 1$\beta$ - hydroxy - 5 - oxo-4-(2'-carboxyethyl) - 7a$\beta$ - ethyl - 3a$\alpha$,4$\beta$,5,6,7,7a - hexahydro-indane (III, with Y=—$CH_2$—$CH_3$, R'=H) were introduced into 60 cc. of acetyl chloride. The reaction mixture was agitated and heated to reflux for a period of one hour.

The solution obtained was distilled to dryness. The residue was dissolved in dichlorethane and cooled to 0° C.

The organic phase was washed with sodium bicarbonate, dried, filtered and distilled to dryness. The $\delta$-lactone of 1$\beta$-acetoxy-4-(2'-carboxyethyl)-5-hydroxy-7a$\beta$-ethyl-3a$\alpha$,4$\beta$,7,7a-tetrahydro-indane (IV, with Y=—$CH_2$—$CH_3$, R'=COCH$_3$) was obtained. The product occurred in the form of an oil which was utilized as such for the next step of the snythesis.

This product is not described in the literature.

In an anologous manner, the lactonization of the propylated homolog of compound III leads to the $\delta$-lactone of 1$\beta$-acetoxy-4-(2' - carboxyethyl)-5-hydroxy-7a$\beta$-n-propyl-3a$\alpha$,4$\beta$,7,7a-tetrahydro-indane (IV, with Y=—$CH_2$—$CH_2$—$CH_3$, R'=COCH$_3$).

This compound is not described in the literature.

STEP F.—13$\beta$ - ETHYL-4,5-SECO-$\Delta^9$-GONENE-17$\beta$-OL-3,5-DIONE (V, WITH Y=—$CH_2$—$CH_3$, R'=H)

(1) *Preparation of the magnesium compound.*—3.7 gm. of grated magnesium were placed in a balloon flask having a refluxing column, nitrogen inlet, an introduction ampoule and mechanical agitation. Then after having primed the mixture with several drops, a mixture of 27 gm. of 5-bromo-2-ethylenedioxy-pentane in 80 cc. of tetrahydrofuran was introduced gradually over a period of one hour under agitation at 20–25° C. Agitation was continued for a further 30 minutes at 20–25° C. and 100 gm. of a solution of 4,4-ethylenedioxy-pentyl-magnesium bromide were obtained testing 0.9 mol/kg.

(2) *Grignard reaction.*—The $\delta$-lactone of 1$\beta$-acetoxy-4-(2'-carboxyethyl) - 5 - hydroxy - 7a$\beta$ - ethyl - 3a$\alpha$,4$\beta$,7,7a - tetrahydro - indane (IV, with Y=—$CH_2$—$CH_3$, R'=COCH$_3$) was dissolved at room temperature in 30 cc. of tetrahydrofuran while agitating under an atmosphere of nitrogen and while cooling.

Thereafter over a period of 40 minutes, the solution of 4,4-ethylenedioxy-pentyl-magnesium bromide prepared above was added and the agitation was continued after the addition for a period of a further 40 minutes. Then, some water was added to the reaction mixture and the tetrahydrofuran was eliminated from the reaction mixture by distillation at a temperature of 40–45° C.

(3) *Alkaline treatment.*—The residue obtained above was introduced into 100 cc. of a solution of 2 N potassium hydroxide in methanol. The reaction mixture was heated to reflux for a period of one hour under an atmosphere of nitrogen. Thereafter the reaction mixture was neutralized with acetic acid and the methanol was removed by distillation under vacuum.

(4) *Acid hydrolysis.*—The residue obtained from the preceding step was introduced into 75 cc. of acetic acid and 25 cc. of water. The reaction mixture was heated for one hour at 90° C. Thereafter, the acetic acid was distilled therefrom under vacuum and the residue was taken up with a mixture of benzene and water (1:1).

The organic phase was decanted. The wash liquors were neutralized with sodium bicarbonate and re-extracted with benzene. The benzenic extracts were combined with the organic phase, washed with sodium bicarbonate, dried and evaporated to dryness under vacuum. The residue obtained was entrained with isopropyl ether in order to dry the same. 16 gm. of an oily product was obtained which was dissolved in benzene and subjected to chromatography through magnesium silicate.

On elution with methylene chloride containing 10% of acetone, 9.6 gm. of 13β-ethyl-4,5-seco-Δ⁹-gonene-17β-ol-3,5-dione (V, with Y=—CH₂—CH₃, R′=H) was obtained.

This compound is slightly soluble in water, soluble in organic solvents except for isopropyl ether and petroleum ether.

This product is not described in the literature.

In an analogous manner, the δ-lactone of 1β-acetoxy-4-(2′-carboxyethyl) - 5 - hydroxy - 7aβ - n-propyl-3aα,4β, 7,7a-tetrahydro-indane, by reaction with 4,4-ethylenedioxy-pentyl-magnesium bromide followed by alkaline treatment, then by acid hydrolysis leads to 13β-n-propyl-4,5-seco-Δ⁹-gonene-17β-ol-3,5-dione (V, with Y=—CH₂—CH₂—CH₃, R′=H)

recovered in the form of an oil.

This product is not described in the literature.

STEP G.—13β-ETHYL-Δ⁴,⁹-GONADIENE-17β-OL-3-ONE (VI, WITH Y=—CH₂—CH₃, R′=H)

8 gm. of 13β-ethyl-4,5-seco-Δ⁹-gonene-17β-ol-3,5-dione (V, with Y=—CH₂—CH₃, R′=H) were dissolved at room temperature while agitating under an atmosphere of nitrogen in 12 cc. of anhydrous toluene. Over the space of 3 minutes, 12 cc. of a toluenic solution of sodium t-amylate testing 2.05 gm. of sodium per 100 cc. were added thereto.

The agitation of the reaction mixture was mtaintained for a period of 2 hours at room temperature and thereafter the reaction mixture was neutralized with 1 cc. of acetic acid.

The toluene was eliminated by distillation under vacuum. The residue was taken up with methylene chloride, washed with water, dried, filtered and evaporated to dryness. Thereafter the residue was entrained with isopropyl ether in order to completely dehydrate the same. 4.56 gm. of a product was obtained.

The product obtained was triturated in ethyl acetate and recrystallized from methyl-ethyl-ketone. 3.12 gm. of 13β-ethyl-Δ⁴,⁹-gonadiene-17β-ol-3-one (VI, with Y=—CH₂—CH₃, R′=H) was obtained having a melting point of 157° C. and a specific rotation $$[\alpha]_D^{20} = -338° \pm 2°$$

(c.= 1% in methanol).

The compound occurred in the form of prisms and was insoluble in water, very slightly soluble in ether, slightly soluble in alcohols, acetone and benzene and solube in choroform.

Analysis.—C₁₉H₂₆O₂; molecular weight=286.4. Calculated: C, 79.67%; H, 9.15%. Found: C, 79.7%; H, 8.9%. U.V. spectra in ethanol: λ max at 303–304 mμ ε=20,850.

The product is not described in the literature.

In an analogous manner the cyclization of the propylated homolog of compound V leads to 13β-n-propyl-Δ⁴,⁹-gonadiene-17β-ol-3-one (VI, with Y′=—CH₂—CH₂—CH₃, R′=H)

This product is already known.

STEP H.—13β - ETHYL-Δ¹,³,⁵⁽¹⁰⁾-GONATRIENE-3,17β-DIOL OR 18-NOR-13βETHYL-ESTRADIOL (Compound VIII, WITH Y=—CH₂—CH₃, R′=H)

1 gm. of 13β-ethyl-Δ⁴,⁹-gonadien-17β-ol-3-one (VI, with Y=—CH₂—CH₃, R′=H) was dissolved while agitating under an atmosphere of nitrogen and at a temperature of about 110° C. in 2 cc. of acetic acid anhydride and refluxing was maintained for a period of 2 hours thereafter.

The reaction mixture was next cooled to room temperature. 1 cc. of acetyl bromide was added thereto and the reaction mixture was further agitated for a period of 2 hours.

Next, the reaction mixture was poured into iced water. Ammonium hydroxide solution was added to a pH of 8–9. The precipitate was vacuum filtered and washed with water. The residue obtained was taken up in a mixture of sodium hydroxide solution and methanol (3:10). Then the solution was heated for 2 hours at reflux and acetic acid was thereafter added to it to obtain a pH of 5–6. The methanol was eliminated by distillation under vacuum. The residue formed was taken up with iced water, vacuum filtered and washed with water.

The product obtained was dissolved in 15 cc. of acetone. 0.1 gm. of animal carbon black containing 10% of palladium hydroxide was added and the reaction mixture was hydrogenated for a period of 2 hours under agitation.

Next, the reaction mixture was vacuum filtered and the catalyst washed with acetone. The filtrate and the wash liquor were combined and evaporated to dryness. The residue was recrystallized from alcohol. 0.55 gm. of 13β - ethyl - Δ¹,³,⁵⁽¹⁰⁾ - gonatriene - 3,17β - diol (VIII, with Y=—CH₂—CH₃, R′=H) were obtained having a melting point of 187° C. and a specific rotation $$[\alpha]_D^{20} = +51 \pm 1°$$

(c.=1% in dioxane).

The product occured in the form of prisms and was insoluble in water, very slightly soluble in ether and alcohols, slightly soluble in benzene and chloroform and soluble in acetone.

Analysis.—C₁₉H₂₆O₂; molecular weight = 286.4. Calculated: C, 79.67%; H, 9.15%. Found: C, 79.6%; H, 8.9%.

The product is not described in the literature.

In an analogous manner, the isomerization of the propylated homolog of compound VI leads to 13β-n-propyl-Δ¹,³,⁵⁽¹⁰⁾-gonatriene-3,17β-diol or 18-nor-13β-n-propylestradiol (VIII, with Y = –CH₂–CH₂–CH₃, R′ = H), melting with sublimation at about 181° C. and having a specific rotation [α] ᴅ²⁰= +61° ∓ 2° (c = 0.25% in ethanol), identical to the product described by Veluz et al (Tetrahydron Letters, No. 3, pp. 127–130, 1961) in the form of a chloromethylenic solvate.

The previous examples are illustrative of the invention. It is to be understood, however, that other procedures and expedients known to those skilled in the art may be followed without departing from the spirit of the invention and the scope of the appended claims.

We claim:

1. The process of producing a 4,5-seco-Δ⁹-gonene steroid of the formula

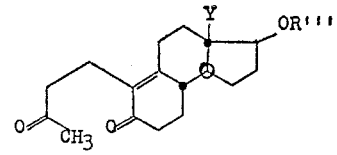

wherein Y represents lower alkyl and R‴ is selected from the group consisting of hydrogen and the acyl radical of an organic carboxylic acid having from 1 to 18 carbon atoms which comprises the steps of:
(a) condensing a lower alkyl ester of 5-oxo-6-heptenoic acid with 2-lower alkyl-cyclopentane-1,3-dione in the presence of an alkaline condensation agent,
(b) treating the condensation product with an acidic compound selected from the group consisting of mineral acids, organic acids and Lewis-type acids, (c) treating the racemic 1,5-dioxo-4-(2'carboxyethyl)-7a-lower alkyl-5,6,7,7a-tetrahydro-indane with an optically active base, (d) separating the salt of the optically active base with the dextrorotatory 1,5-dioxo-4-(2'-carboxyethyl)-7aβ-lower alkyl-5,6,7,7a-tetrahydro-indane, (e) acidifying and recovering said dextrorotatory 1,5-dioxo-4-(2'-carboxyethyl)-7aβ-lower alkyl-5,6,7,7a-tetrahydro-indane, (f) reacting the dextrorotatory 1,5-dioxo-4-(2'-carboxyethyl)-7aβ-lower alkyl-5,6,7,7α-tetrahydro-indane with a mixed metal hydride, (g) hydrogenating the indane compound of the formula

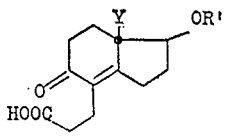

wherein Y has the above-noted meaning and R' is selected from the group consisting of hydrogen and the acyl radical of an organic carboxylic acid having from 1 to 7 carbon atoms in the presence of a hydrogenation catalyst consisting essentially of elemental palladium, (h) lactonizing the 1β-hydroxy-5-oxo-4-(2'-carboxyethyl)-7aβ-lower alkyl-3aα,4β,5,6,7,7a-hexahydro-indane by the action of lactonizing agent selected from the group consisting of lower alkanoic acid chloride and lower alkanoic acid anhydrate, (i) reacting the δ-lactone of the formula

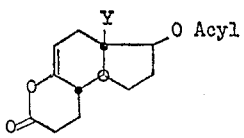

wherein Y has the above-noted meaning and acyl represents the acyl radical of a lower alkanoic acid derived from said lactonizing agent with a 4-ketal of 4-oxo-pentyl-magnesium halide in an inert organic solvent, (j) treating the reaction product with an alkaline agent, (k) hydrolyzing the reaction product by the action of an aqueous acidic solution, and (l) recovering said 4,5-seco-Δ⁹-gonene steroid.

2. The process of claim 1, step a, wherein said lower alkyl ester of 5-oxo-6-heptenoic acid is methyl 5-oxo-6-heptenoate.

3. The process of claim 1, step a, wherein said lower alkyl ester of 5-oxo-6-heptenoic acid is ethyl 5-oxo-6-heptenoate.

4. The process of claim 1, step a, wherein said 2-lower alkyl-cyclopentane-1,3-dione is 2-methyl-cyclopentane-1,3-dione.

5. The process of claim 1, step a, wherein said 2-lower alkyl-cyclopentane-1,3-dione is 2-ethyl-cyclopentane-1,3-dione.

6. The process of claim 1, step a, wherein said 2-lower alkyl-cyclopentane-1,3-dione is 2-n-propyl-cyclopentane-1,3-dione.

7. The process of claim 1, step a, wherein said alkaline condensation agent empolyed for the condensation of the lower alkyl ester of 5-oxo-6-heptenoic acid with 2-lower alkyl-cyclopentane-1,3-dione is a tertiary organic base.

8. The process of claim 7 wherein said tertiary base is selected from the group consisting of pyridine, lower alkyl pyridine, triethylamine and salts thereof.

9. The process of claim 1, step b, wherein said acidic compound is an aqueous hydrochloric acid and racemic 1,5-dioxo-4-(2'-carboxyethyl)-7a-lower alkyl-5,6,7,7a-tetrahydro-indane is recovered.

10. The process of claim 1, step b, wherein said acidic compound is present in an anhydrous inert organic solvent, racemic 1,5-dioxo-4-(2'-carbo-lower alkoxy-ethyl)-7a-lower alkyl-5,6,7,7a-tetrahydro-indane is recovered and treated with an aqueous mineral acid to give 1,5-dioxo-4-(2'-carboxyethyl)-7a-lower alkyl-5,6,7,7a-tetrahydro-indane.

11. The process of claim 10 wherein said acidic compound is a Lewis-type acid selected from the group consisting of triethylamine benzoate, triethylamine acetate, trimethylamine benzoate and trimethylamine acetate.

12. The process of claim 1, step c, wherein said optically active base is 1-ephedrine and the 1-ephedrine salt of dextrorotatory 1,5-dioxo-4-(2'-carboxyethyl)-7aβ-lower alkyl-5,6,7,7a-tetrahydro-indane is recovered.

13. The process of claim 1, step f, wherein said mixed metal hydride employed to reduce 1,5-dioxo-4-(2'-carboxyethyl)-7aβ-lower alkyl-5,6,7,7a-tetrahydro-indane is an alkali metal borohydride.

14. The process of claim 1, step g, wherein said hydrogenation is conducted in an acidic to neutral reaction media.

15. The process of claim 14 wherein said hydrogenation catalyst is palladized carbon black.

16. The process of claim 14 wherein said hydrogenation catalyst is palladium on a barium sulfate base.

17. The process of claim 14 wherein said hydrogenation catalyst is palladium on a calcium sulfate base.

18. The process of claim 14 wherein said hydrogenation catalyst is palladium on a strontium sulfate base.

19. The process of claim 14 wherein, in said indane compound, R' is an acyl radical of an organic carboxylic acid having from 1 to 7 carbon atoms and the compound

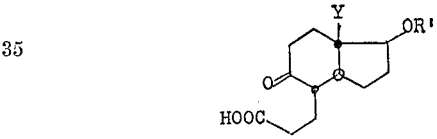

wherein R' has the above meaning is recovered and is treated with an alkali metal hydroxide in a refluxing aqueous alcoholic media and 1β-hydroxy-5-oxo-4-(2'-carboxymethyl)-7aβ-lower alkyl-3aα,4β,5,6,7,7a-hexahydro-indane is recovered.

20. The process of claim 1, step h, wherein said lactonizing agent is acetic acid anhydride, the lactonization reaction is conducted in the presence of a weakly basic agent selected from the group consisting of sodium acetate and trimethylamine and the δ-lactone of 1β-acetoxy-4-(2'-carboxyethyl)-5-hydroxy-7aβ-lower alkyl-3aα,4β,7,7a-tetrahydro indane is recovered.

21. The process of claim 1, step h, wherein said lactonizing agent is acetyl chloride, and the δ-lactone of 1β-acetoxy-4(2'-carboxyethyl)-5-hydroxy-7aβ-lower alkyl-3aα,4β,7,7a-tetrahydro indane is recovered.

22. The process of claim 1, step i, wherein said 4-ketal of 4-oxo-pentyl-magnesium halide is selected from the group consisting of the bromide, chloride and iodide of 4-oxo-pentyl-magnesium whose ketone function is in the form of a ketal selected from the group consisting of ethylene ketal, propylene ketal, dimethyl ketal and diethyl ketal.

23. The process of claim 22 wherein said reaction is conducted in the presence of tetrahydrofuran.

24. The process of claim 22 wherein said reaction is conducted in the presence of an aliphatic ether selected from the group consisting of ethyl ether and butyl ether.

25. The process of claim 1, step j, wherein said alkaline agent is an alkali metal hydroxide in a solvent selected from the group consisting of water, lower alkanols and mixtures thereof.

26. The process of claim 1, step k, wherein said aqueous acidic solution is aqueous acetic acid.

27. The process of claim 1, step k, wherein said aqueous acidic solution is dilute hydrochloric acid.

28. The process of producing dextrorotatory 1,5-di-oxo-4-(2'-carboxyethyl) - 7aβ - methyl - 5,6,7,7a-tetrahydro-indane which comprises the steps of
   (a) condensing a lower alkyl ester of 5-oxo-6-heptenoic acid with 2-methyl-cyclopentane-1,3-dione in the presence of hydroquinone and an alkaline condensation agent selected from the group consisting of pyridine, lower alkyl pyridine, triethylamine and salts thereof,
   (b) treating the condensation product with an acidic compound selected from the group consisting of mineral acids, organic acids and Lewis-type acids,
   (c) treating the racemic 1,5-dioxo-4-(2'-carboxyethyl)-7a - methyl - 5,6,7,7a - tetrahydro-indane with an optically active base,
   (d) separating the salt of the optically active base with the dextrorotatory 1,5-dioxo - 4 - (2' - carboxyethyl)-7aβ-methyl-5,6,7,7a-tetrahydro-indane,
   (e) acidifying and recovering said dextrorotatory 1,5-dioxo-4-(2'-carboxyethyl) - 7aβ - methyl - 5,6,7,7a-tetrahydro-indane.

29. The process of producing an indane compound of the formula

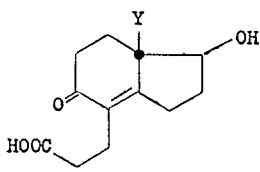

wherein Y represents lower alkyl, which comprises the steps of reacting the dextrorotatory 1,5-dioxo-4-(2'-carboxyethyl) - 7aβ - lower alkyl - 5,6,7,7a-tetrahydro-indane with an alkali metal borohydride and recovering said indane compound.

30. The process of producing the hexahydro-indane compound of the formula

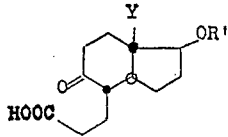

wherein Y represents lower alkyl and R' is selected from the group consisting of hydrogen and the acyl radical of an organic carboxylic acid having from 1 to 7 carbon atoms which comprises the steps of hydrogenating the indane compound of the formula

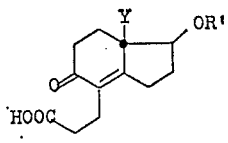

wherein Y and R' have the above-noted meaning in the presence of a palladium hydrogenation catalyst in an acidic to neutral reaction media and recovering said hexahydro-indane compound.

31. The process of producing the δ-lactone of the formula

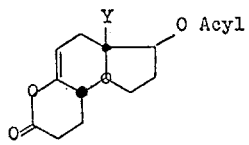

wherein Y represents lower alkyl and acyl represents the acyl radical of a lower alkanoic acid which comprises the steps of lactonizing 1β-hydroxy-5-oxo-4-(2'-carboxyethyl)-7aβ-lower alkyl-3aα,4β,5,6,7,7a-hexahydro-indane by the action of a lower alkanoic acid anhydride in the presence of a weakly basic agent and recovering said δ-lactone wherein said acyl is derived from said lower alkanoic acid anhydride.

32. The process of producing a 4,5-seco-Δ⁹-gonene steroid of the formula

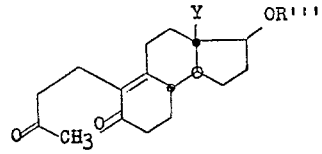

wherein Y represents lower alkyl and R''' is selected from the group consisting of hydrogen and the acyl radical of an organic carboxylic acid having from 1 to 18 carbon atoms which comprises the steps of:
   (a) reacting the δ-lactone of the formula

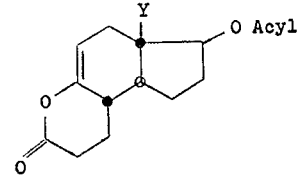

wherein Y has the above-noted meaning and acyl represents the acyl radical of a lower alkanoic acid with a 4-ketal of 4-oxo-pentyl-magnesium halide selected from the group consisting of the bromide, chloride and iodide of 4-oxo-pentyl-magnesium whose ketone function is in the form of a ketal selected from the group consisting of ethylene ketal, propylene ketal, dimethyl ketal, and diethyl ketal, in the presence of an inert organic solvent,
   (b) treating the reaction product with an alkali metal hydroxide in a solvent selected from the group consisting of water, lower alkanols and mixtures thereof,
   (c) hydrolyzing the reaction product by the action of an aqueous acidic solution, and
   (d) recovering said 4,5-seco-Δ⁹-gonene steroid.

33. A compound selected from the group consisting of 1,5 - dioxo - 4 - (2'-carboxyethyl)-7a-lower alkyl-5,6,7,7a-tetrahydro-indane and its lower alkyl esters.

34. The dextrorotatory isomer of 1,5-dioxo-4-(2'-carboxyethyl)-7a-lower alkyl-5,6,7,7a-tetrahydro-indane.

35. The salt of l-ephedrine and dextrorotatory 1,5-dioxo-4-(2'-carboxyethyl)-7aβ-lower alkyl-5,6,7,7a-tetrahydro-indane.

36. The compound of the formula

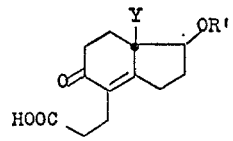

wherein Y represents lower alkyl and R' is selected from the group consisting of hydrogen and the acyl radical of an organic carboxylic acid having from 1 to 7 carbon atoms.

37. 1β - formyloxy - 5 - oxo - 4-(2'-carboxyethyl)-7aβ-methyl-5,6,7,7a-tetrahydro-indane.

38. The compound of the formula

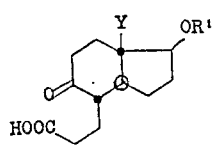

wherein Y represents lower alkyl and R' is selected from the group consisting of hydrogen and the acyl radical of an organic carboxylic acid having from 1 to 7 carbon atoms.

39. 1β - hydroxy - 5 - oxo - 4(2'-carboxyethyl)-7aβ-lower alkyl-3aα,4β,5,6,7,7a-hexahydro-indane.

40. 1β - acetoxy - 5 - oxo - 4-(2'-carboxyethyl)-7aβ-methyl-3aα,4β,5,6,7,7a-hexahydro-indane.

41. The δ-lactone of the formula

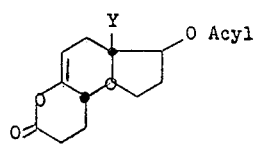

wherein acyl represents the acyl radical of a lower alkanoic acid and Y represents lower alkyl.

42. The δ-lactone of 1β-acetoxy-4-(2'-carboxyethyl-5-hydroxy-7aβ-methyl-3aα,4β,7,7a-tetrahydro-indane.

43. The δ-lactone of 1β-acetoxy-4-(2'-carboxymethyl)-5-hydroxy-7aβ-ethyl-3aα,4β,7,7a-tetrahydro-indane.

44. The δ-lactone of 1β-acetoxy-4-(2'-carboxyethyl)-5-hydroxy-7aβ-n-propyl-3aα,4β,7,7a-tetrahydro-indane.

45. A compound selected from the group consisting of 1,5 - dioxo - 4 - (2' - carboxyethyl) - 7a - methyl - 5,6,7,7a-tetrahydro-indane and its lower alkyl esters.

46. A compound selected from the group consisting of 1,5 - dioxo - 4 - (2' - carboxyethyl) - 7a - ethyl - 5,6,7,7a-tetrahydro-indane and its lower alkyl esters.

47. A compound selected from the group consisting of 1,5 - dioxo - 4 - (2' - carboxyethyl) - 7a - n - propyl - 5,6,7,7a-tetrahydro-indane and its lower alkyl esters.

48. The dextrorotatory isomer of 1,5-dioxo-4-(2'-carboxyethyl)-7a-methyl-5,6,7,7a-tetrahydro-indane.

49. The dextrorotatory isomer of 1,5-dioxo-4-(2'-carboxyethyl)-7a-ethyl-5,6,7,7a-tetrahydro-indane.

50. The dextrorotatory isomer of 1,5-dioxo-4-(2'-carboxyethyl)-7a-n-propyl-5,6,7,7a-tetrahydro-indane.

51. The salt of 1-ephedrine and dextrorotatory 1,5-dioxo - 4-(2' - carboxyethyl) - 7aβ - methyl - 5,6,7,7a - tetrahydro-indane.

52. The salt of 1-ephedrine and dextrorotatory 1,5-dioxo - 4 - (2' - carboxyethyl) - 7aβ - ethyl - 5,6,7,7a - tetrahydro-indane.

53. The salt of 1-ephedrine and dextrorotatory 1,5-dioxo - 4 - (2' - carboxyethyl) - 7aβ - n - propyl - 5,6,7,7a-tetrahydro-indane.

54. 1β - hydroxy - 5 - oxo - 4 - (2' - carboxyethyl)-7aβ-methyl-5,6,7,7a-tetrahydro-indane.

55. 1β - hydroxy - 5 - oxo - 4(2' - carboxyethyl) - 7aβ-ethyl-5,6,7,7a-tetrahydro-indane.

56. 1β - hydroxy - 5 - oxo - 4 - (2' - carboxyethyl)-7aβ-n-propyl-5,6,7,7a-tetrahydro-indane.

57. 1β - hydroxy - 5 - oxo - 4 - (2' - carboxyethyl)-7aβ-methyl-3aα,4β,5,6,7,7a-hexahydro-indane.

58. 1β - hydroxy - 5 - oxo - 4 - (2' - carboxyethyl)-7aβ-ethyl-3aα,4β,5,6,7,7a-hexahydro-indane.

59. 1β - hydroxy - 5 - oxo - 4 - (2' - carboxyethyl)-7aβ-n-propyl-3aα,4β,5,6,7,7a-hexahydro-indane.

60. The process of producing an indane compound of the formula

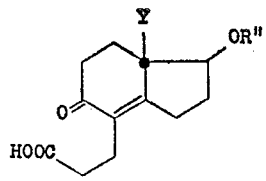

wherein Y represents lower alkyl and R″ represents the acyl radical of an organic carboxylic acid having from 1 to 7 carbon atoms, which comprises the steps of reacting the dextrorotatory 1,5-dioxo-4-(2'-carboxyethyl) - 7aβ - lower alkyl-5,6,7,7a-tetrahydro-indane with an alkali metal borohydride, esterifying the resulting 1β-hydroxy-5-oxo-4-(2'-carboxyethyl)-7aβ-lower alkyl-5,6,7,7a-tetrahydro-indane by the action of an organic carboxylic acid having from 1 to 7 carbon atoms in the presence of an acid esterification catalyst and recovering said indane compound.

References Cited

UNITED STATES PATENTS

| | | | |
|---|---|---|---|
| 2,839,537 | 6/1958 | Miescher et al. | 260—340.9 |
| 3,052,672 | 9/1962 | Nomine et al. | 260—239.5 |
| 3,019,252 | 1/1962 | Nomine et al. | 260—397.4 |
| 3,115,507 | 12/1963 | Nomine et al. | 260—397.4 |
| 3,192,267 | 6/1965 | Nomine et al. | 260—586 |

FOREIGN PATENTS 632,347  11/1963  Belgium.

OTHER REFERENCES

Fieser et al.: Steroids, Reinhold Pub. Corp., N.Y. (1959), p. 445. OD 40S. F 44.

Velluz et al.: Comptes Rendus, vol. 2S7(21) (Nov. 18, 1963), pp. 3086–8. O46, A14.

JAMES A. PATTEN, *Primary Examiner.*